Patented Feb. 6, 1951

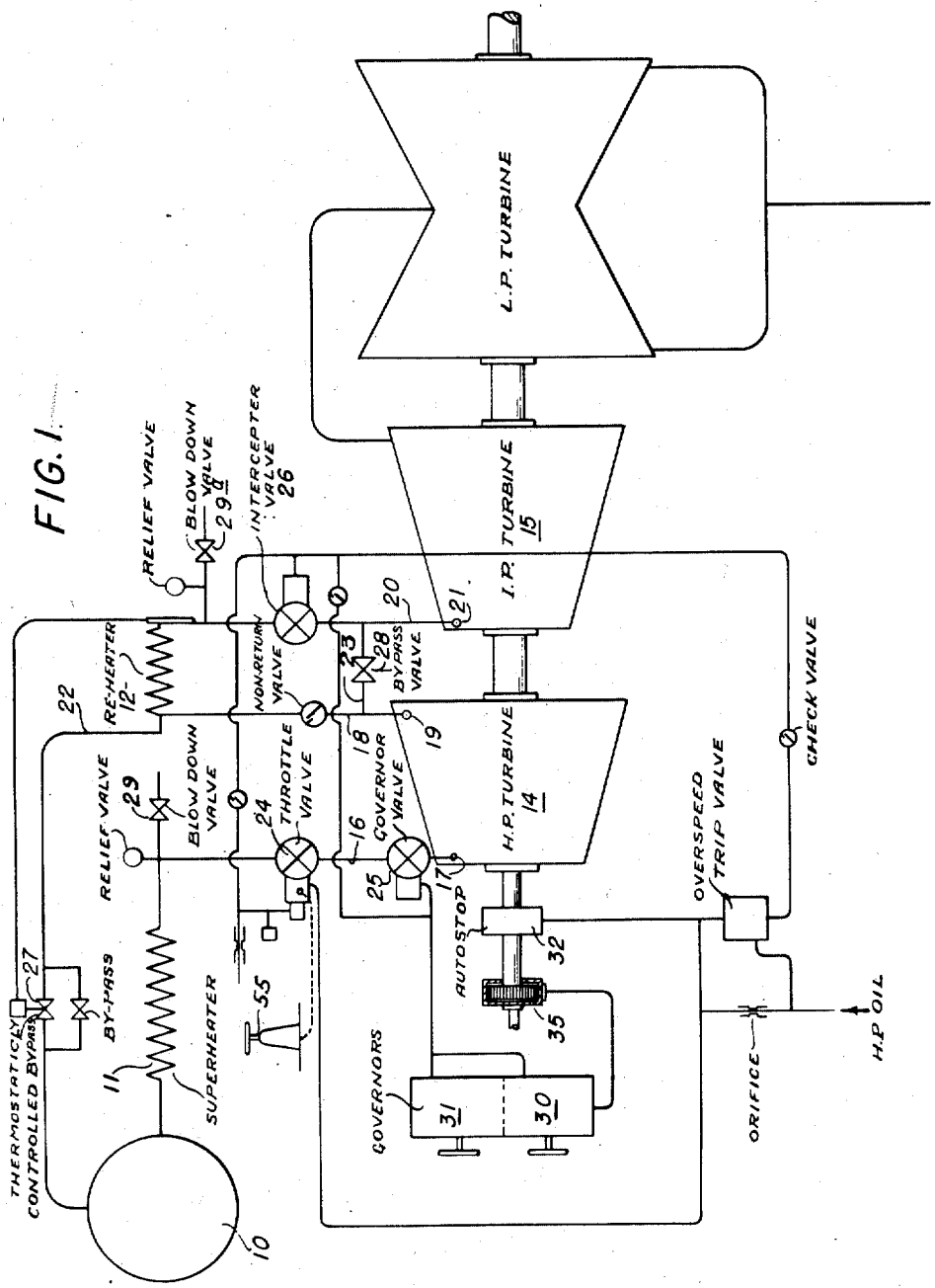

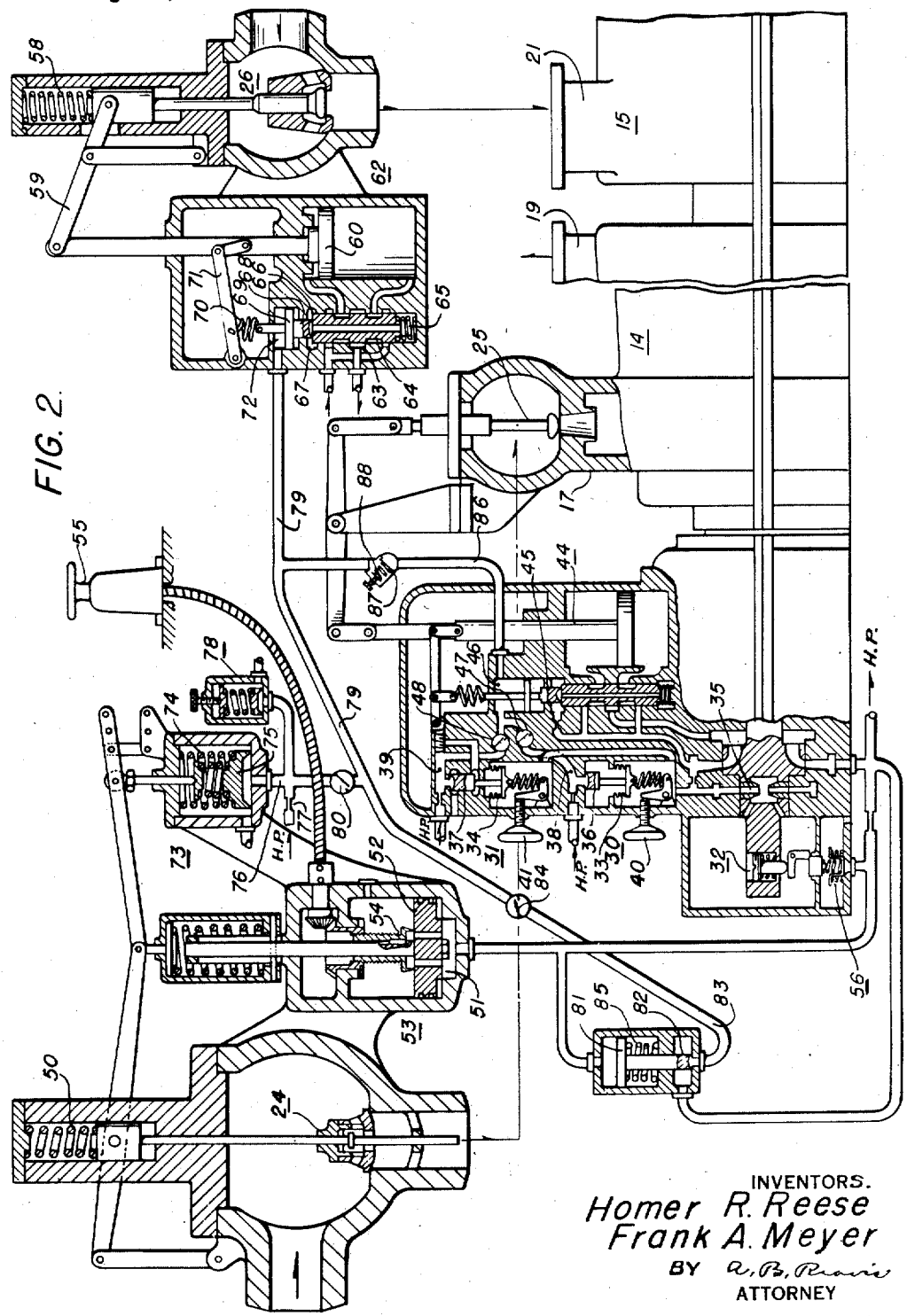

2,540,691

UNITED STATES PATENT OFFICE 2,540,691

VALVE CONTROL OF REHEAT TURBINE INSTALLATION

Homer R. Reese, Ridley Park, and Frank A. Meyer, Sharon Hill, Pa., assignors to Westinghouse Electric Corporation, East Pittsburgh, Pa., a corporation of Pennsylvania Application August 19, 1948, Serial No. 45,035

13 Claims. (Cl. 60—73)

The invention relates to a turbine installation, wherein motive fluid is supplied to first and second turbine sections, and it has for an object to provide valves for the turbine sections, with the valve for the first section subject to manual control and the valve for the second section opened and closed in consequence of the first valve being opened and closed.

A further object of the invention is to provide a control device providing a pressure responsive to travel of the valve for a first turbine section and which pressure is used to open and to close the valve for a second turbine section, whereby the second valve is opened and closed in consequence of opening and closing of the first.

Another object of the invention is to provide a control device of the above character operated by the valve for a first turbine section for opening and closing the valve of a second turbine section and which is constructed and arranged to provide for an initial portion of opening of the first valve before the second valve starts to open.

A further object of the invention is to provide apparatus of the above character wherein an autostop or emergency governor responds to a predetermined overspeed of the turbine to close the valves.

A further object of the invention is to provide apparatus, as aforesaid, with an admission valve in the supply connection of the first turbine section and controlled by a main governor and by an auxiliary governor having a smaller percentage of regulation than the main governor, with speed changers providing for settings of the governors such that the auxiliary governor supersedes the main governor in control of the admission valve to close the latter at a speed slightly in excess of the normal or rated speed and less than the speed at which it would be closed by the main governor, and with means responsive to the auxiliary governor assuming control of the turbine such that it takes over control both of the admission valve and of the valve for the second turbine section.

The reheater for a turbine is comprised by a heating surface integrated with the boiler heating surface and it should be protected against overheating whenever flow of steam therethrough to the intermediate turbine section is insufficient in relation to the heat input. Furthermore, as a considerable volume of steam is in the piping, including the reheater, between the high-pressure and intermediate-pressure turbine sections, protection against overspeeding should be afforded by the provision of an interceptor valve, which should not only close in response to operation of the emergency or autostop governor, but which should move in a closing direction at a turbine speed less than that at which the autostop or emergency governor operates, this being desirable for the reason that the interceptor valve is called upon to control flow of steam from the reheater to the intermediate-pressure section of the turbine and received by the reheater not only from the exhaust end of the high-pressure section but also from the drum of the boiler when flow from the latter to the reheater to prevent overheating is required. Therefore, protection of the turbine against excessive speeds also calls for protection of the reheater. Protection of the reheater as well as the superheater against overheating should be available particularly during the starting period, in the event of load drops, or when the autostop or emergency governor operates at a predetermined overspeed. Therefore, the boiler, superheater, reheater and turbine installation are piped and valved so that steam from the boiler drum may pass in parallel through the superheater and the reheater and escape to the atmosphere, blow-down valves being provided for this purpose; so that steam from the superheater may pass in series through the high-pressure turbine section and a reheater by-pass to the intermediate turbine section for warming up the turbine and for acceleration to a suitable intermediate speed; and so that the steam supplied to the high-pressure turbine section may be gradually increased, the reheater by-pass gradually restricted and flow from the reheater to the intermediate section gradually increased by gradual opening of the interceptor valve to bring the turbine to its rated speed, under which condition the throttle and interceptor valves are wide open and the admission valve is responsive to the governor. An important aspect of the present invention is the interrelation of the throttle and the interceptor valves as well as responsiveness of the interceptor valve to emergency governor operation as well as to speed governor operation at a speed above normal or rated speed.

Accordingly, a further object of the invention is to provide, with a throttle valve and its manual control station, an interceptor valve which is opened and closed in response to travel of the throttle valve.

Another object of the invention is to operate the interceptor valve by means of a pressure-responsive servo-motor so that the latter may readily respond to a pressure dependent on throttle valve travel, to an autostop or emergency governor pressure to close the interceptor valve, or to a governing pressure.

These and other objects are effected by the invention as will be apparent from the following description and claims taken in connection with the accompanying drawings, forming a part of this application, in which:

Fig. 1 is a diagram of a reheat turbine and boiler installation; and

Fig. 2 is a partial sectional view of the interrelated throttle and interceptor valves and showing the relation thereof to the turbine sections and to the governors.

Referring to Fig. 1, there is shown diagrammatically a steam drum 10, a superheater 11, and a reheater 12 of a boiler installation and high and intermediate-pressure turbine sections 14 and 15 of a turbine installation. It is to be understood that such turbine sections may be embodied in a single machine or separate machines. Figs. 1 and 2 are intended to represent either type, any indicated separateness in the drawings being due to diagrammatic representation of the turbine components.

The piping of the boiler and turbine installation includes a pipe 16 for supplying superheated steam to the inlet 17 of the high-pressure turbine section 14, a pipe 18 for conducting steam discharging from the outlet 19 of the latter to the reheater 12, a pipe 20 for supplying reheated steam to the inlet 21 of the intermediate-pressure section, a pipe 22 for supplying saturated steam from the drum 10 to the reheater, and a reheater by-pass 23.

Valves for the installation include the throttle valve 24 and the admission valve 25 in the connection 16 for supplying superheated steam to the high-pressure turbine section, the interceptor valve 26 in the connection 20 for supplying reheated steam to the intermediate-pressure turbine section, the valve 27 in the saturated steam pipe, the valve 28 in the reheater by-pass, as well as blow-down valves 29 and 29a for the superheater and the reheater.

The turbine operates main and auxiliary governors 30 and 31 for controlling the admission and interceptor valves and it is provided with an autostop or emergency governor 32 which operates, at a predetermined overspeed, to close the throttle and the interceptor valves.

The main and auxiliary governors are more particularly disclosed and claimed in the application of Bryant, Serial No. 36,832, filed July 3, 1948, now Patent No. 2,504,640, dated April 18, 1950. The governors include bellows elements 33 and 34 subject to pressure provided by the turbine-driven impeller 35. The bellows elements operate relays 36 and 37 to provide governing fluid pressure ranges in the spaces 38 and 39.

The auxiliary governor 31 includes a compensator which operates, pursuant to change of pressure in the space 39 in consequence of speed change due to load change, on the relay 37 to bring about further change in space pressure to reduce the speed change due to load change.

The main and auxiliary governors are provided with speed changers 40 and 41. With the compensator providing for the governing pressure change from no load to full load with less speed change for the auxiliary governor than the main governor, the speed changers are adjusted so that the main governor governs for the normal or rated speed; and, upon a slight increase in speed above normal, the main governor is superseded by the auxiliary governor, the latter then governing, as hereinafter described, at a speed higher than normal.

The admission valve servo-motor 44 has a relay 45 responsive to pressure in the space 46 to which oil under pressure is supplied from the spaces 38 and 39 through check valves 47 and 48 so that the pressure in space 46 is the higher of the pressures in the spaces 38 and 39.

The speed changers are set so that the main governor governs for the normal or rated speed and the auxiliary governor governs at a speed slightly greater than the rated speed. As the compensator provides for operation of the auxiliary governor for the control pressure range from no load to full load with less change in speed than the main governor, it has a higher rate of pressure change. Therefore, at the speed slightly higher than rated speed, the pressure in the space 39 becomes larger than that in the space 38 and it supersedes the latter and takes over control of the admission valve. Because of the larger rate of pressure change of the auxiliary governor, after taking charge of the admission valve, it moves the latter in a closing direction more rapidly than it would be moved by the main governor and it is then effective to control the servo-motor for operating the interceptor valve, as hereinafter described. Not only does the auxiliary governor operate through the servo-motor to govern the interceptor valve for a turbine speed higher than normal but assures against such flow through the interceptor valve as would result in a turbine speed high enough for tripping of the autostop or emergency governor, this being desirable in case of load drop to avoid the necessity of resetting the autostop and reopening of the throttle following autostop operation.

The throttle valve 24 is biased in a closing direction by a spring 50 and it is moved in an opening direction by liquid under pressure in the space 51 acting on the piston 52 of the servo-motor, at 53. The servo-motor has a valve or relay 54 operated by the handwheel 55 so that, as the handwheel is moved in the direction for opening, pressure in the space 51 causes the piston to follow the handwheel to exert the opening effort. As liquid pressure in the space 51 acting on the piston 52 opens the throttle valve and holds the latter open, when the pressure in such space drops, because of tripping open of the relief valve 56 by the autostop or emergency governor, the throttle quickly closes under influence of the spring 50.

The interceptor valve 26 is preferably biased in a closing direction by the spring 58 and it is connected, through the linkage 59, to the operating piston 60 of the servo-motor, at 62. The servo-motor has a relay 63 moved in response to fluid pressure and spring forces to move the operating piston 60 for opening and closing of the interceptor valve, as determined by the controlling pressure applied to the relay.

The relay 63 includes a piston valve 64, a spring 65 pushing upwardly thereon, a piston area 66 at the upper end of the piston valve subject to pressure in the space 67, a cup valve 68 controlling escape of liquid from the space 67 so that such pressure and the spring 65 cause the piston valve 64 to follow the cup valve 68, and means for moving the cup valve including the piston 69 and the follow-up spring 70 connecting the piston and the follow-up linkage 71 connected to the operating piston. The piston 69 is exposed to pressure in the chamber 72.

Change in pressure in the chamber 72 causes the piston 69 and the cup valve to move. The piston valve follows the cup valve and the operating piston moves to move the intercepting valve and to change the loading of the spring 70 until the spring and fluid pressure forces are balanced with the piston valve restored to neutral or cut-off position.

A device, at 73, provides a control pressure which is varied by throttle valve travel. As the throttle valve is opened, loading of the spring 74 on the cup valve 75 is reduced to lower the liquid pressure in the space 76 supplied from a suitable source through an orifice 77; and, with such pressure applied to the piston 69 of the relay, the latter is moved for servo-motor operation to move the interceptor valve 26 in an opening direction. Therefore, with both the throttle valve and the interceptor valve closed, there is provided means whereby, as the handwheel 55 is operated to open the throttle valve, the interceptor valve is opened.

The interceptor valve 26 may open with the throttle valve 24 or its opening may be delayed so that the latter has a small portion of travel in an opening direction from closed position before the interceptor valve starts to open. For example, for a rated speed of 3600 R. P. M., the throttle valve may be opened sufficiently to bring the speed up to 1200 R. P. M., steam from the high-pressure turbine section by-passing the reheater and flowing directly to the intermediate-pressure turbine section. Any suitable means may be employed to obtain the initial throttle valve travel required for this purpose without opening the interceptor valve. For example, there is shown a variable relief valve 78 connected in parallel with the control device, at 73, and set for the maximum pressure which is required for the interceptor valve in closed position and with the relay in neutral. With the throttle valve closed, the loading of the spring means 74 would be higher than that of the relief valve so that an initial portion of opening travel of the throttle valve can occur without lowering of the control pressure. For further increase in turbine speed, both the throttle and interceptor valves are moved in an opening direction until, at the rated or normal speed, the throttle and interceptor valves are both wide open and the by-pass valve 28 is closed. At the rated speed, the main governor comes into play to control the admission valve, thereby controlling flow of steam through the turbine elements and the reheater in accordance with the load.

In addition to opening and closing the interceptor valve as a consequence of opening and closing the throttle valve, to provide for operation of the interceptor valve in response to the emergency and auxiliary governors, the relay pressure chamber 72 communicates with a space 79 with which the space 76 communicates through a check valve 80.

The emergency governor pressure space 51 has exposed thereto the piston 81 for closing a valve 82 to interrupt a pressure passage 83 communicating, through a check valve 84, with the space 79. Upon drop in pressure in the space 51 due to operation of the emergency governor, the spring 85 opens the valve 82, whereupon liquid under high pressure is supplied through the check valve 84 to the chamber 72 for operation of the servo-motor, at 62, to close the interceptor valve.

Provision is also made for control of the interceptor valve servo-motor, at 62, by auxiliary governing pressure when the latter controls the admission valve. To this end, an auxiliary governor passage 86 communicates, through the check valve 87, with said space 79. The check valve 87 is loaded by any suitable means, such as a spring 88, to restrict flow of liquid from the passage 86 to the space 79 and the chamber until such time as the auxiliary governor takes control of the admission valve for governing at a speed somewhat higher than the normal or rated speed, whereupon the interceptor valve is governed for a higher turbine speed. This arrangement is desirable for the reason that the reheater is not only supplied with steam which has passed through the admission valve and the high-pressure section to the reheater but also with steam flowing directly from the boiler drum to and through the reheater to prevent overheating of the latter. For example, for a rated or normal speed of 3600 R. P. M., the steam input to the turbine, particularly from the reheater to the intermediate-pressure section, may be such as to drive the turbine at a higher speed, in which case, the auxiliary governor assumes control and governs the interceptor valve for a higher speed, for example, a speed of 3700 R. P. M.

It will be apparent that the interceptor valve servo-motor relay is responsive to three pressures, first, pressure varied by throttle valve travel, second, pressure due to operation of the emergency governor and, third, governing pressure of the auxiliary governor when the latter takes over control of the turbine. Operation of the interceptor valve occurs in a variable manner in response to variable opening and closing of the throttle valve and the controlling operation carried on by the auxilary governor. On the other hand, upon operation of the emergency governor, pressure is quickly provided to close the interceptor valve. The check valves 80, 84 and 87 assure of operation of the interceptor valve servo-motor in response to the highest of these pressures.

From the foregoing, it will be apparent that the invention provides for automatic opening of the interceptor valve in consequence of opening the throttle valve, for slightly delayed opening of the interceptor valve relative to the throttle valve incident to starting, for regulated operation of the turbine at a speed higher than normal whenever such regulation is required because of the steam supply for the intermediate-pressure turbine section, and for closing of the interceptor valve pursuant to emergency governor operation. Further, while the invention is particularly useful in controlling valves for a reheat turbine installation, as above described, it will be apparent that it is applicable wherever turbine valves are required to be controlled in a similar manner.

While the invention has been shown in but one form, it will be obvious to those skilled in the art that it is not so limited, but is susceptible of various changes and modifications without departing from the spirit thereof.

What we claim is:

1. In a turbine installation wherein superheated steam is supplied to a first turbine section and the steam discharging from the latter is normally reheated and then supplied to a second turbine section, the combination of, a throttle valve in the supply connection of the first turbine section, an interceptor valve in the supply connection for the second turbine section, apparatus for opening and closing the throttle valve and including a spring for biasing such valve to closed position and manually-controllable means for opening and holding open the throttle valve against the force of its spring, means for opening and closing the interceptor valve, and means for controlling the last-named means in response to throttle valve position so that the interceptor valve may be opened and closed in consequence of the throttle valve being opened and closed.

2. In a turbine installation wherein superheated steam is supplied to a first turbine section and the steam discharging from the latter is normally reheated and then supplied to a second turbine section, the combination of, a throttle valve in the supply connection of a first turbine section; an interceptor valve in the supply connection for the second turbine section; apparatus for opening and closing the throttle valve and including a spring for biasing the throttle valve to closed position and manually-controllable means for opening and holding open the throttle valve against the force of said spring; means for opening and closing the interceptor valve; means for controlling the last-named means in response to throttle valve position so that the interceptor valve is opened and closed in consequence of the throttle valve being opened and closed; and an emergency governor operative in response to a predetermined turbine overspeed to render the throttle valve opening means ineffective so that the spring closes the throttle valve and to operate the opening and closing means of the interceptor valve to close the latter.

3. In a turbine installation wherein superheated steam is supplied to a first turbine section and the steam discharging from the latter is normally reheated and then supplied to a second turbine section, the combination of, a throttle valve in the supply connection of a first turbine section; an interceptor valve in the supply connection for the second turbine section; apparatus for opening and closing the throttle valve and including a spring for biasing the throttle valve to closed position and manually-controllable means for opening and holding open the throttle valve against the force of said spring; pressure-responsive means for opening and closing the interceptor valve; a device providing a controlling pressure which varies in response to throttle valve travel; and means providing for application of said controlling pressure to the pressure-responsive means so that the interceptor valve is opened and closed in consequence of the throttle valve being opened and closed.

4. In a turbine installation wherein superheated steam is supplied to a first turbine section and the steam discharging from the latter is normally reheated and then supplied to a second turbine section, the combination of, a throttle valve in the supply connection of a first turbine section; an interceptor valve in the supply connection for the second turbine section; apparatus for opening and closing the throttle valve and including a spring for biasing the throttle valve to closed position and manually-controllable means for opening and holding open the throttle valve against the force of said spring; pressure-responsive means for opening and closing the interceptor valve; a device providing a controlling pressure which varies in response to throttle valve travel; and means providing for application of said controlling pressure to the pressure-responsive means so that the interceptor valve is opened and closed in consequence of the throttle valve being opened and closed; said device including means providing for controlling pressure which acts on the pressure-responsive means to hold the interceptor valve closed during a small portion of initial travel of the throttle valve from closed position.

5. In a turbine installation wherein first and second turbine sections have motive fluid supply connections, the combination of, a first valve in the motive fluid supply connection for the first turbine section, a second valve in the motive fluid supply connection for the second turbine section, a spring for biasing the first valve in a closing direction, fluid-pressure-operated means for opening the first valve against the force of the spring and including a member which is manually operable to control the opening movement, a servo-motor for opening and closing the second valve and including a pressure-responsive relay, a control device for developing fluid pressure which varies in response to travel of the first valve, and means for applying control device fluid pressure to said relay for operation of the servo-motor so that the second valve is opened and closed in consequence of the first valve being opened and closed.

6. Apparatus as claimed in claim 5 wherein the control device includes means providing for an initial portion of travel of the first valve from closed position in an opening direction with the control device pressure held at a value sufficient to maintain the second valve closed.

7. In a turbine installation wherein first and second turbine sections have motive fluid supply connections, the combination of, a first valve in the motive fluid supply connection for the first turbine section, a second valve in the motive fluid supply connection for the second turbine section, an emergency governor operative in response to a predetermined turbine overspeed, means for maintaining fluid under pressure which is relieved by emergency governor operation, a spring for biasing the first valve in a closing direction, a piston operatively connected to the first valve, means manually operable to provide for application of said pressure to the piston to open the first valve against the force of said spring and to hold such valve open, a servo-motor for opening and closing the second valve and including a pressure-responsive relay, a device for developing fluid pressure in response to travel of the first valve, and means for applying the control device fluid pressure to said relay to effect opening of the second valve in consequence of opening of the first valve.

8. In a turbine installation wherein first and second turbine sections have motive fluid supply connections, the combination of, a first valve in the motive fluid supply connection for the first turbine section, a second valve in the motive fluid supply connection for the second turbine section, an emergency governor operative in response to a predetermined turbine overspeed, means for maintaining fluid under pressure which is relieved by emergency governor operation, a spring for biasing the first valve in a closing direction, a piston operatively connected to the first valve, means manually operable to provide for application of said pressure to the piston to open the first valve against the force of said spring and to hold such valve open, a servo-motor for opening and closing the second valve and including a pressure-responsive relay, a device for developing fluid pressure in response to travel of the first valve, means for applying the control device fluid pressure to said relay to effect opening of the second valve in consequence of opening of the first valve, means responsive to relief of said fluid pressure normally holding the first valve open to provide a stopping fluid pressure, and means providing for application to the relay of the higher one of said control device and stopping pressures, whereby, with the control device pressure applied to the relay, the servo-motor is operated to cause the second valve to be opened and closed in consequence of the first valve being opened and closed and, with the stopping pressure applied, the servo-motor is operated to close the second valve.

9. In a turbine wherein first and second turbine sections having motive fluid supply connections, the combination of, first and second valves in the motive fluid connection for the first turbine section, a third valve in the motive fluid connection for the second turbine section, a spring for biasing the first valve in a closing direction, fluid-pressure-operated means for opening and holding open the first valve against the force of the spring and including a member which is movable manually to control the opening movement, main and auxiliary governors responsive to turbine speed, relays operated by the governors to provide governing fluid pressures, a compensator for the auxiliary governor and operative to provide the range of governing pressure from no load to full load with less change in speed than the main governor, means for controlling the second valve in response to the higher one of said governing pressures, speed changes for the governors and providing for settings thereof such that the auxiliary governor pressure begins to exceed the main governor pressure at a speed slightly greater than the normal or rated speed, a servo-motor for opening and closing the third valve and including a pressure-responsive relay, said relay including a piston area exposed to pressure in a control pressure chamber, a device operated by travel of the first valve to provide a variable control pressure, and means for supplying to said relay control pressure chamber the higher one of the control device and auxiliary governor pressures, whereby the third valve is opened and closed in consequence of the first valve being opened and closed and is controlled by the auxiliary governor pressure whenever the latter exceeds the main governor pressure.

10. In a turbine wherein first and second turbine sections having motive fluid supply connections, the combination of, first and second valves in the motive fluid connection for the first turbine section, a third valve in the motive fluid connection for the second turbine section, a spring for biasing the first valve in a closing direction, fluid-pressure-operated means for opening and holding open the first valve against the force of the spring and including a member which is movable manually to control the opening movement, main and auxiliary governors responsive to turbine speed, relays operated by the governors to provide governing fluid pressures, a compensator for the auxiliary governor and operative to provide the range of governing pressure from no load to full load with less change in speed than the main governor, means for controlling the second valve in response to the higher one of said governing pressures, speed changers for the governors and providing for settings thereof such that the auxiliary governor pressure begins to exceed the main governor pressure at a speed slightly greater than the normal or rated speed, a servo-motor for opening and closing the third valve and including a pressure-responsive relay, said relay including a piston area exposed to pressure in a control pressure chamber, a device operated by travel of the first valve to provide a variable control pressure, an emergency governor responsive to a predetermined overspeed to relieve the pressure of said fluid-pressure-operated means in consequence of which the spring closes the first valve, means responsive to relief of the last-named fluid pressure to provide a stopping pressure, and means for supplying to said relay control pressure chamber the highest one of the control device, auxiliary governor and stopping pressures, whereby application of control device pressure opens and closes the third valve in consequence of the first valve being opened and closed, application of auxiliary governor pressure effects regulating action of the third valve, and application of the stopping pressure closes the third valve.

11. In a turbine installation wherein superheated steam is supplied to a first turbine section and the steam discharging from the latter is normally reheated and then supplied to a second turbine section, the combination of, throttle and admission valves in the supply connection of the first turbine section; an interceptor valve in the supply connection of the second turbine section; main and auxiliary governors operated by the turbine and providing governing pressures dependent upon speed; a compensator for the auxiliary governor and providing change in auxiliary governing pressure at a greater rate than the main governing pressure, whereby the governing pressure change from no load to full load is effected by the auxiliary governor with less change in speed than the main governor; speed changers for the governors and providing for settings such that the auxiliary governor pressure begins to exceed the main governor pressure at a speed slightly above normal and reaches the maximum at a lower speed than would be required for the main governor pressure to reach the maximum; pressure-responsive means for moving the admission valve and operative, with increase in pressure, to move the valve in a closing direction and vice versa; means providing for the imposition of the higher of said main and auxiliary governing pressure on the pressure-responsive means; means including a servo-motor for opening and closing the interceptor valve; said servo-motor including a relay responsive to pressure for servo-motor operation such that, as the pressure is increased, the interceptor valve is moved in a closing direction and vice versa; means providing a control pressure dependent on throttle valve position so that such pressure changes from maximum with the throttle valve closed to minimum with such valve open; and means providing for the imposition of the higher one of the control and auxiliary governor pressures on the interceptor valve servo-motor relay.

12. In a turbine installation wherein superheated steam is supplied to a first turbine section and the steam discharging from the latter is normally reheated and then supplied to a second turbine section, the combination of, throttle and admission valves in the supply connection of the first turbine section; an interceptor valve in the supply connection of the second turbine section; means providing fluid under pressure and including a normally-closed relief valve; means operative to close the throttle valve and subject to said fluid pressure to hold the valve open; an emergency governor responsive to a predetermined turbine overspeed to trip open said relief valve to reduce said fluid pressure for closing of the throttle valve; pressure-responsive means for varying the admission valve position such that an increase in pressure moves the admission valve in a closing direction and vice versa; main and auxiliary governors responsive to turbine speed; relays moved by the respective main and auxiliary governors to provide main and auxiliary governing fluid pressures; a compensator for the auxiliary governor and providing for change in auxiliary governing pressure at a greater rate than the main governing pressure, whereby the governing pressure change from no load to full load is effected by the auxiliary governor with less change in speed than the main governor; speed changers for the governors and providing for settings such that the auxiliary governing pressure begins to exceed the main governing pressure at a speed slightly above the normal or rated speed and reaches the maximum at a lower speed than would be required for the main governing pressure to reach the maximum; means providing for imposition on said pressure-responsive means of the higher of said main and auxiliary governing pressures; means including a servo-motor for opening and closing the interceptor valve; said servo-motor including a relay responsive to pressure for servo-motor operation such that, as the pressure is increased, the interceptor valve is moved in a closing direction and vice versa; means providing a first control pressure dependent on throttle valve position so that such pressure changes over a range from maximum with the throttle valve closed to minimum with the throttle valve open; means providing a second control pressure upon decrease in emergency governor pressure due to opening of said relief valve; and means providing for the imposition on the interceptor valve servo-motor relay of the highest of the first and second control and the auxiliary governing pressures.

13. In a turbine installation wherein superheated steam is supplied to a first turbine section and the steam discharging from the latter is normally reheated and then supplied to a second turbine section, the combination of, throttle and admission valves in the supply connection of a first turbine section; an interceptor valve in the supply connection for the second turbine section; main and auxiliary governors operated by the turbine and each providing a governing pressure dependent upon speed; a compensator for the auxiliary governor and providing for change in auxiliary governing pressure at a greater rate than the main governing pressure, whereby the governing pressure change from no load to full load is effected by the auxiliary governor with less change in speed than the main governor; speed changers for the governors and providing for settings such that the auxiliary governing pressure begins to exceed the main governing pressure at a speed slightly above normal and reaches the maximum at a lower speed than would be required for the main governing pressure to reach the maximum; pressure-responsive means for moving the admission valve and arranged so that increase in pressure moves the valve in a closing direction and vice versa; means providing for the imposition of the higher of the auxiliary and main governing pressures on the pressure-responsive means; apparatus for opening and closing the throttle valve and including a spring for biasing such valve to closed position and manually controllable means for opening and holding open the throttle against the force of the spring; means including a servo-motor for opening and closing the interceptor valve; said servo-motor including a relay responsive to pressure for servo-motor operation such that, when the pressure is increased, the interceptor valve is moved in a closing direction and vice versa; an emergency governor responsive to a predetermined turbine overspeed for releasing the means holding the throttle valve open so that the spring thereof is effective to close the throttle valve; means providing a first control pressure dependent on throttle valve position so that such pressure changes from maximum with the throttle valve closed to minimum with such valve open; means providing a second control pressure upon operation of the emergency governor; and means providing for the imposition of the highest of the first and second control pressures and the auxiliary governing pressure on said interceptor valve servo-motor relay.

HOMER R. REESE.
FRANK A. MEYER.

No references cited.

Certificate of Correction

Patent No. 2,540,691　　　　　　　　　　　　　　　　February 6, 1951

HOMER R. REESE ET AL.

It is hereby certified that error appears in the printed specification of the above numbered patent requiring correction as follows:

Column 9, line 38, for the word "changes" read *changers*;

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*